US009430338B2

(12) United States Patent
Scanlon

(10) Patent No.: US 9,430,338 B2
(45) Date of Patent: Aug. 30, 2016

(54) METHOD AND COMPUTING DEVICE FOR RECORDING LOG ENTRIES

(71) Applicant: McKesson Financial Holdings, Hamilton (BM)

(72) Inventor: Ryan Scanlon, Enfield, CT (US)

(73) Assignee: McKesson Financial Holdings, Hamilton (BM)

( * ) Notice: Subject to any disclaimer, the term of this patent is extended or adjusted under 35 U.S.C. 154(b) by 89 days.

(21) Appl. No.: 14/168,632

(22) Filed: Jan. 30, 2014

(65) Prior Publication Data

US 2015/0212904 A1    Jul. 30, 2015

(51) Int. Cl.
*G06F 11/00* (2006.01)
*G06F 11/14* (2006.01)
*G06F 11/34* (2006.01)

(52) U.S. Cl.
CPC ....... *G06F 11/1471* (2013.01); *G06F 11/3476* (2013.01)

(58) Field of Classification Search
CPC .......... G06F 11/1435; G06F 11/1451; G06F 11/1469; G06F 11/1471; G06F 11/1474; G06F 2201/855; G06F 9/466
USPC ......................................................... 714/19
See application file for complete search history.

(56) References Cited

U.S. PATENT DOCUMENTS

| | | | | |
|---|---|---|---|---|
| 6,671,705 | B1* | 12/2003 | Duprey | G06F 11/2058 |
| 7,457,830 | B1* | 11/2008 | Coulter | G06F 11/1471 |
| 2002/0059275 | A1* | 5/2002 | Schofield | G06F 11/1471 |
| 2006/0168192 | A1* | 7/2006 | Sharma | G06F 11/2028 709/224 |
| 2013/0173538 | A1* | 7/2013 | Wilkinson | G06F 17/30584 707/611 |
| 2015/0378840 | A1* | 12/2015 | Shang | G06F 11/1469 714/20 |

OTHER PUBLICATIONS

Apache log4net—Apache log4net: Home [online] [retrieved Jan. 26, 2016]. Retrieved from the Internet: <URL: https://www.logging.apache.org/log4net/>. (dated Dec. 5, 2015); 1 page.
Log4j-Log4j 2 Guide—Apache Log4j 2 [online] [retrieved Jan. 26, 2016]. Retrieved from the Internet: <URL: https://logging.apache.org/log4j/2.x/>. 3 pages.
Enterprise Library [online] [retrieved Jan. 26, 2016]. Retrieved from the Internet: <URL: https://msdn.microsoft.com/en-us/library/ff648951.aspx>. (dated Apr. 2013) 3 pages.

(Continued)

*Primary Examiner* — Yair Leibovich
(74) *Attorney, Agent, or Firm* — Alston & Bird LLP

(57) ABSTRACT

A method, computing device and computer program product are provided to maintain a comprehensive record of log entries, even in an instance in which the recordation of log entries to the primary log temporarily fails. In the context of a method, one or more log entries are written to a primary log. The method also includes determining that writing a log entry to the primary log has failed and writing the log entry to a fallback log in an instance in which writing the log entry to the primary log has failed. The method further includes performing a restoration process. The restoration process includes determining whether the log entry written to the fallback log is able to be written to the primary log. If so, the restoration process writes one or more log entries written to the fallback log to the primary log. If not, the restoration process is repeated.

20 Claims, 7 Drawing Sheets

(56) References Cited

OTHER PUBLICATIONS

Nlog [online] [retrieved Jan. 26, 2016]. Retrieved from the Internet: <URL: http://nlog-project.org/>. 4 pages.

Logger (Java Platform SE 7) [online] [retrieved Jan. 26, 2016]. Retrieved from the Internet: <URL: https://docs.oracle.com/javase/7/docs/api/java/util/logging/Logger.html>. 23 pages.

* cited by examiner

METHOD AND COMPUTING DEVICE FOR RECORDING LOG ENTRIES

TECHNOLOGICAL FIELD

An example embodiment relates generally to a method, computing device and computer program product for recording log entries and, more particularly, to a method, computing device and computer program product for restoring log entries to a primary log that were originally written to a fallback log in an instance in which the primary log had failed.

BACKGROUND

Log entries are recorded for a variety of purposes. For example, computer systems may record log entries for error handling, for auditing purposes, for the collection of statistics, for performance monitoring or the like. Historically, computer systems maintained log entries locally, such as by being stored on a disk local to the computer system. More recently, some computer systems have communicated with third party systems, such as centralized logging services, to record log entries. The third party systems that record log entries are generally remote from the computer system and are accessed via a network, such as the internet.

Although it is of import to consistently record all log entries, the utilization of remote, third party logging services has increased the possibility that issues may arise that may disrupt the recordation of log entries. For example, the network that connects the computer system to the third party logging service may become inoperative or the third party logging service, such as a web server of the third party logging service, may fail such that the computer system is unable to record log entries with the third party logging service.

Some logging services provide failover capabilities. However, these failover capabilities write the log entries only to a failover location. As such, a comprehensive record of the log entries, including both those log entries recorded during normal operation and those log entries recorded during a failover condition, may not be created in an instance in which the third party logging service has experienced a failure.

BRIEF SUMMARY

A method, computing device and computer program product are provided according to example embodiments of the present invention in order to maintain a comprehensive record of log entries, even in an instance in which the recordation of log entries to the primary log temporarily fails. In this regard, the method, computing device and computer program product of an example embodiment provide a failover capability by permitting log entries to be recorded while the primary log has failed. However, the method, computing device and computer program product of an example embodiment may also permit the log entries recorded while the primary log has failed to thereafter be restored to the primary log to create a comprehensive record of the log entries. A method, apparatus and computer program product of an example embodiment therefore provide a record of all log entries that is seamless, regardless of the length of the failure of the primary log.

In one embodiment, a method of recording log entries is provided that includes writing one or more log entries to a primary log. The method also includes determining that writing a log entry to the primary log has failed and writing the log entry to a fallback log in an instance in which writing the log entry to the primary log has failed. The method further includes performing, with a processor, a restoration process. The restoration process includes determining whether the log entry written to the fallback log is able to be written to the primary log. In an instance in which the log entry written to the fallback log is able to be written to the primary log, the restoration process writes one or more log entries written to the fallback log to the primary log. Alternatively, in an instance in which the log entry written to the fallback log is unable to be written to the primary log, the restoration process is repeated.

The primary log may be a remote system, while the fallback log may be a local storage device. In an instance in which the log entry written to the fallback log is able to be written to the primary log, the restoration process of an example embodiment may also include deleting one or more log entries from the fallback log once the one or more log entries are written to the primary log. In an example embodiment, the method may write one or more log entries that were written to the fallback log to the primary log in an instance in which the log entry written to the fallback log is able to be written to the primary log by asynchronously executing a plurality of tasks with each task configured to write a log entry written to the fallback log to the primary log. In this embodiment, the method may determine whether the log entry written to the fallback log is able to be written to the primary log by attempting to write the log entry written to the fallback log to the primary log and, if successful, then executing the plurality of tasks to asynchronously so as to write a plurality of log entries written to the fallback log to the primary log.

The method of an example embodiment may also include requesting access to the fallback log. In this embodiment, the restoration process may be performed contingent upon granting of access to the fallback log. The restoration process of this embodiment may also include securing exclusive rights to the fallback log upon granting of access to the fallback log and relinquishing the exclusive rights to the fallback log in an instance in which the restoration process is complete.

In another embodiment, a computing device for recording log entries is provided that includes processing circuitry configured to write one or more log entries to a primary log. The processing circuitry is also configured to determine that writing a log entry to the primary log has failed and, if so, to write the log entry to a fallback log. The processing circuitry is also configured to perform a restoration process that includes determining whether the log entry written to the fallback log is able to be written to the primary log. In an instance in which the log entry written to the fallback log is able to be written to the primary log, the processing circuitry is also configured to write one or more log entries written to the fallback log to the primary log. However, in an instance in which the log entry written to the fallback log is unable to be written to the primary log, the processing circuitry is further configured to repeat the restoration process.

In one embodiment, the primary log includes a remote system and the fallback log includes a local storage device. In an instance in which the log entry written to the fallback log is able to be written to the primary log, the processing circuitry of an example embodiment may be further configured to perform the restoration process by deleting one or more log entries from the fallback log once the one or more log entries are written to the primary log. The processing circuitry of an example embodiment may be configured to write one or more log entries written to the fallback log to the primary log in an instance in which the log entry written to the fallback log is able to be written to the primary log by asynchronously executing a plurality of tasks with each task configured to write a log entry written to the fallback log to the primary log. In this embodiment, the processing circuitry may be configured to determine whether the log entry written to the fallback log is able to be written to the primary log by attempting to write a log entry written to the fallback log to the primary log and, if successful, then executing the plurality of tasks to asynchronously write a plurality of log entries written to the fallback log to the primary log.

The processing circuitry of an example embodiment may also be configured to request access to the fallback log. In this embodiment, the processing circuitry may be configured to perform the restoration process contingent upon granting of access to the fallback log. The processing circuitry of this example embodiment may also be configured to perform the restoration process by securing exclusive rights to the fallback log upon granting of access to the fallback log and by relinquishing the exclusive rights to the fallback log in an instance in which the restoration process is complete.

In a further embodiment, a computer program product for recording log entries may be provided that includes a non-transitory computer-readable medium having program code stored therein with the program code including program code instructions configured, upon execution, to write one or more log entries to a primary log. The program code also includes program code instructions configured to determine that writing a log entry to the primary log has failed and to write the log entry to a fallback log in an instance in which writing the log entry to the primary log has failed. The program code also includes program code instructions configured to perform a restoration process. The restoration process includes determining whether the log entry written to the fallback log is able to be written to the primary log. In an instance in which the log entry written to the fallback log is able to be written to the primary log, the restoration process also includes writing one or more log entries written to the fallback log to the primary log. However, in an instance in which the log entry written to the fallback log is unable to be written to the primary log, the restoration process is repeated.

In an instance in which the log entry written to the fallback log is able to be written to the primary log, the program code instruction configured to perform the restoration process may be further configured to delete one or more log entries from the fallback log once the one or more log entries are written to the primary log. In one example embodiment, the program code instructions configured to write one or more log entries written to the fallback log to the primary log in a instance in which the log entry written to the fallback log is able to be written to the primary log include program code instructions configured to asynchronously execute a plurality of tasks with each task configured to write a log entry written to the fallback log to the primary log. The program code instructions configured to determine whether the log entry written to the fallback log is able to be written to the primary log may include, in one embodiment, program code instructions configured to attempt to write the log entry written to the fallback log to the primary log and, if successful, to then execute the plurality of tasks to asynchronously write a plurality of log entries written to the fallback log to the primary log.

The program code of an example embodiment may also include program code instructions configured to request access to the fallback log. In this embodiment, the performance of the restoration process is contingent upon granting of access to the fallback log. The program code instructions configured to perform the restoration process may, in an example embodiment, further include program code instructions configured to secure exclusive rights to the fallback log upon granting of access to the fallback log and to relinquish the exclusive rights to the fallback log in an instance in which the restoration process is complete.

BRIEF DESCRIPTION OF THE DRAWINGS

Figure 1:
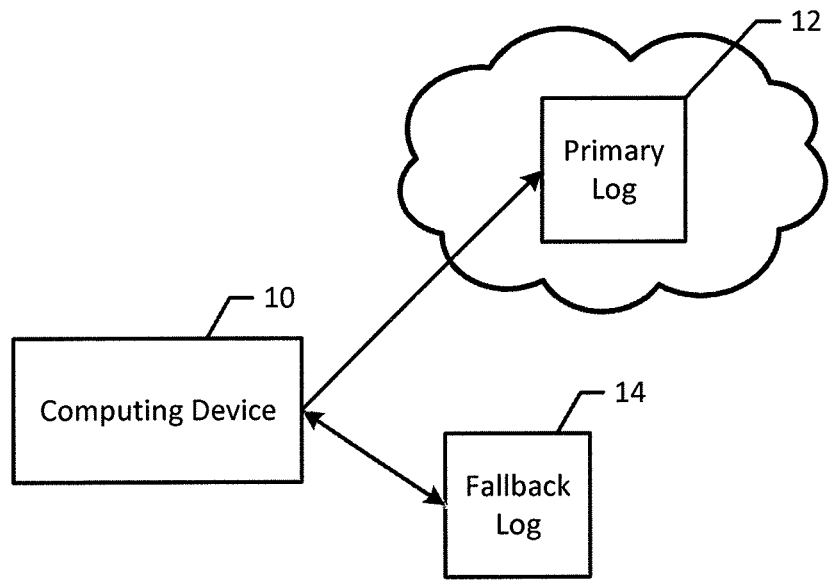
Figure 2:
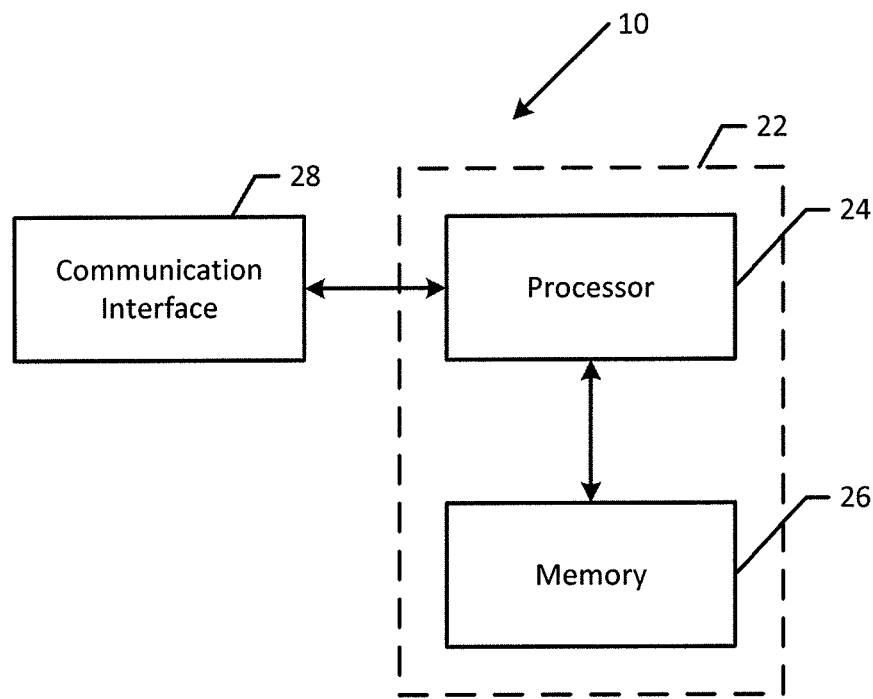
Figure 3:
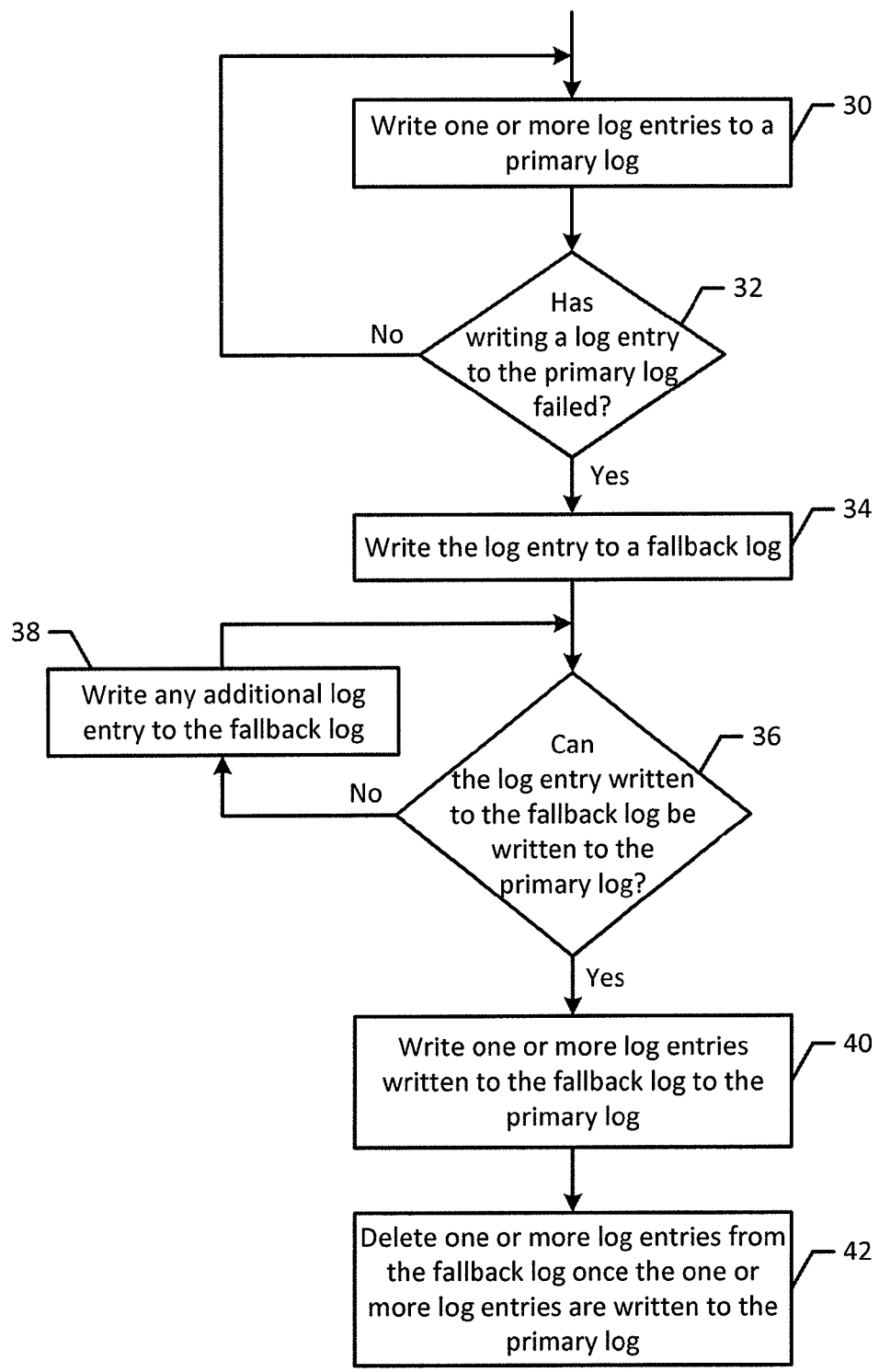
Figure 4:
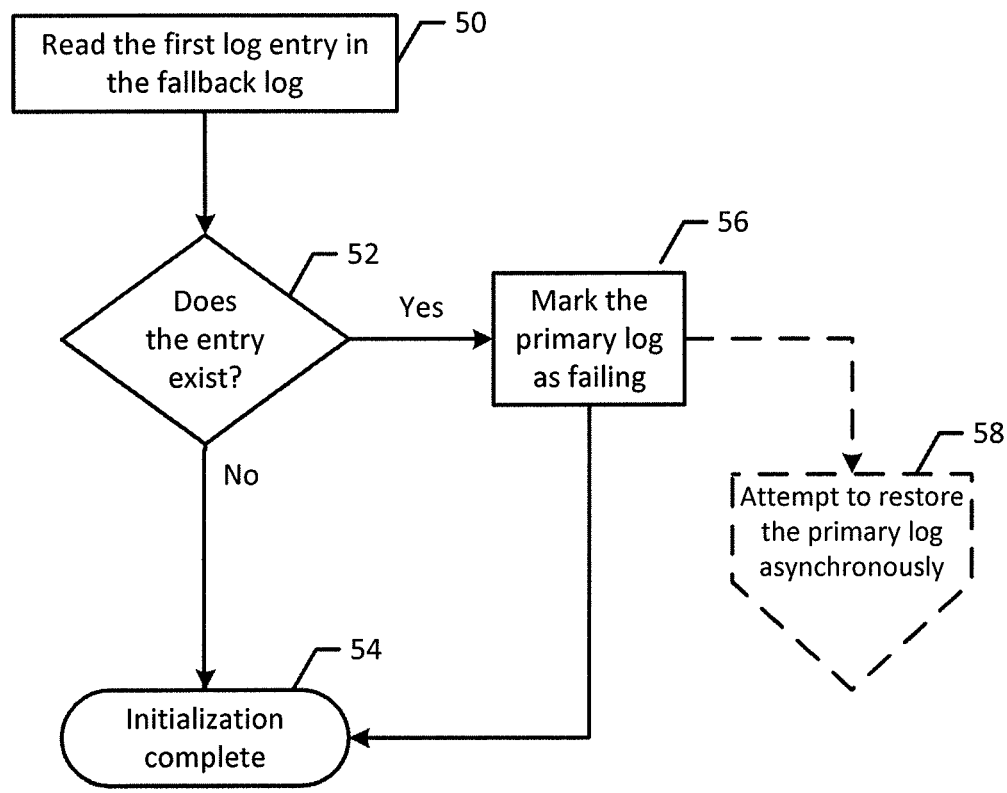
Figure 5:
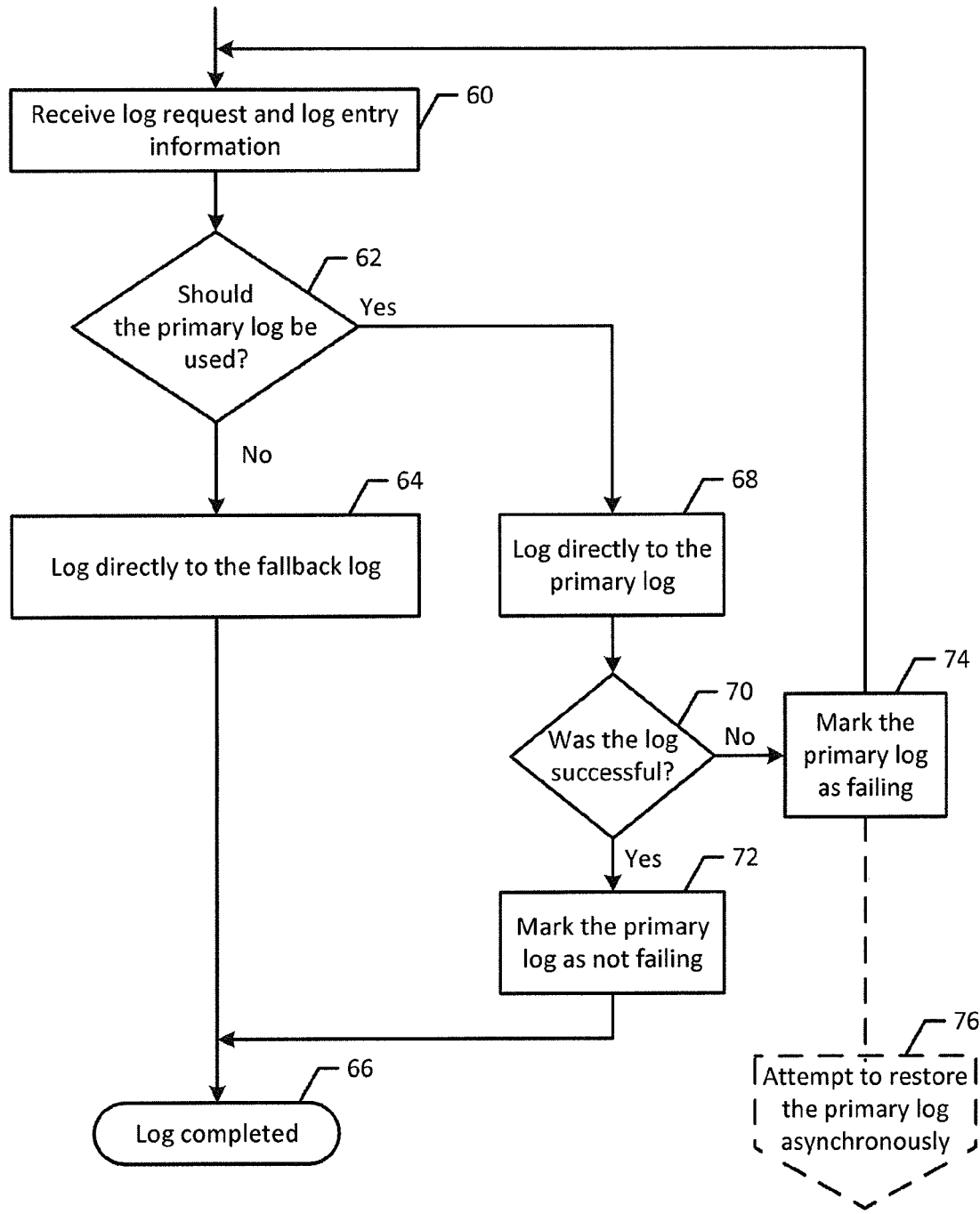
Figure 6:
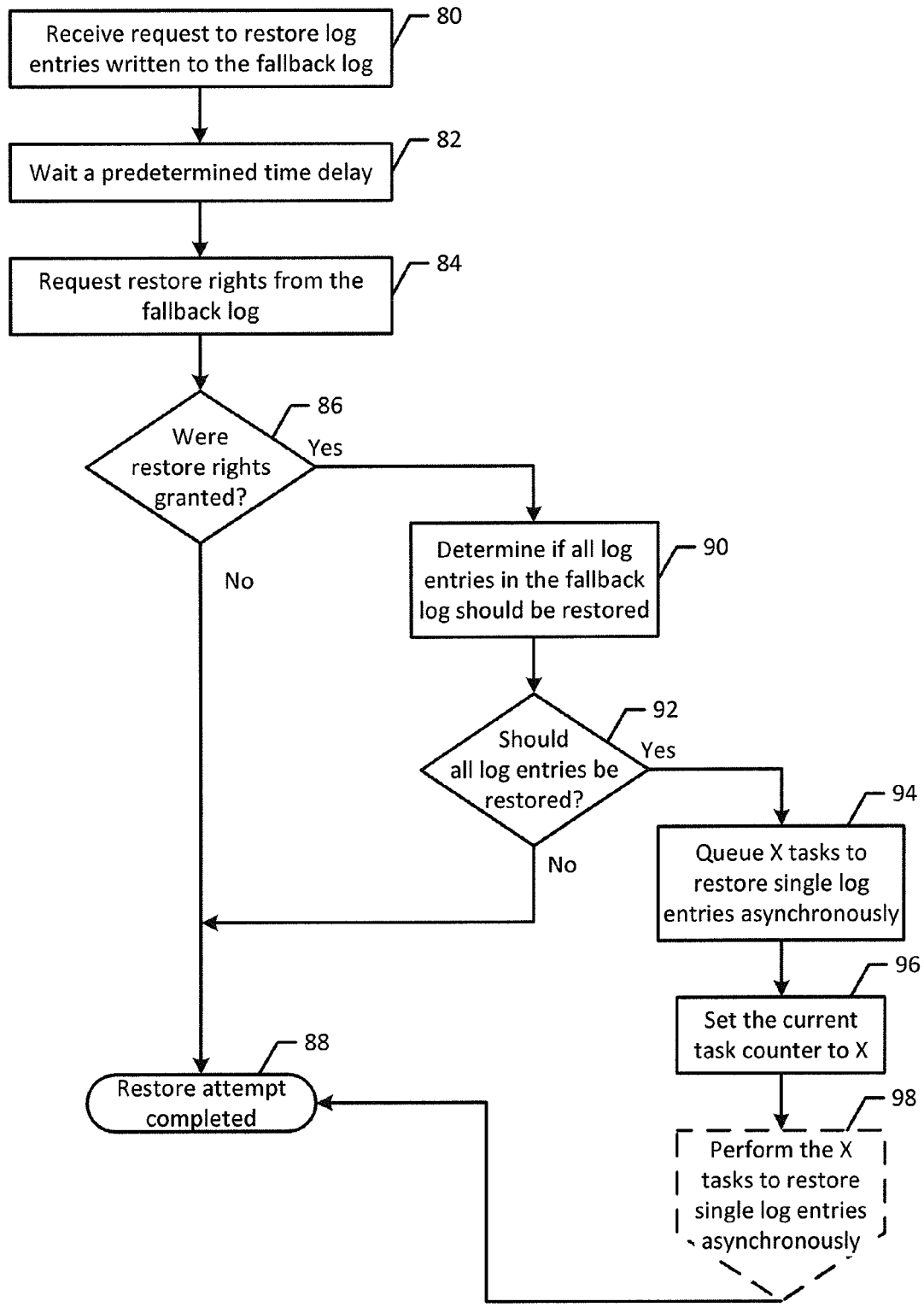
Figure 7:
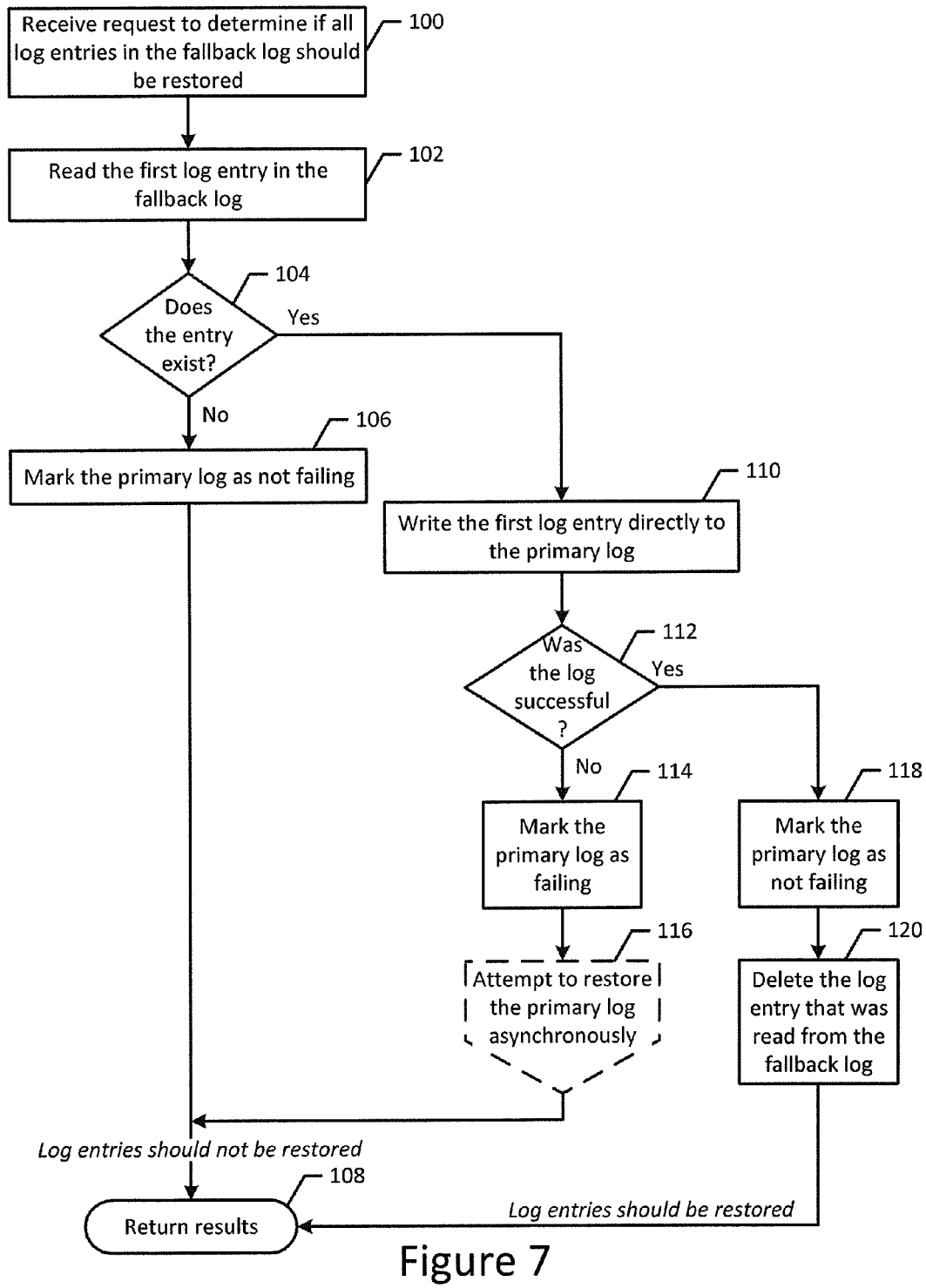
Figure 8:
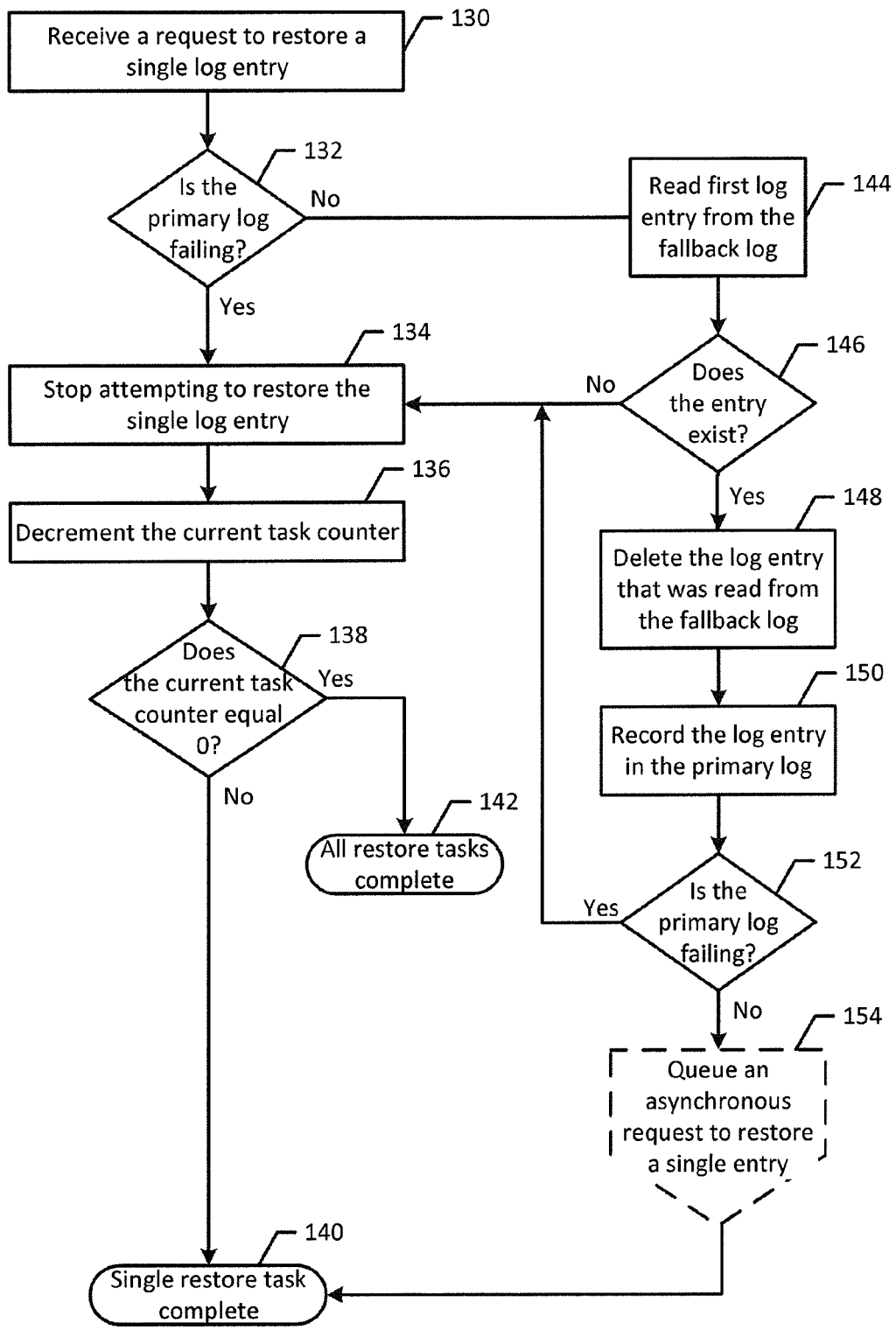

Having thus described example embodiments of the invention in general terms, reference will now be made to the accompanying drawings, which are not necessarily drawn to scale, and wherein:

FIG. 1 is a block diagram of a system for recording log entries that includes both a primary log and a fallback log in accordance with an example embodiment of the present invention;

FIG. 2 is a block diagram of a computing device that may be specifically configured in accordance with an example embodiment of the present invention;

FIG. 3 is a flowchart illustrating operations performed, such as by the computing device of FIG. 2, in order to record log entries in accordance with an example embodiment of the present invention;

FIG. 4 is a flowchart illustrating operations performed, such as by the computing device of FIG. 2, in order to initialize the state of the primary log in accordance with an example embodiment of the present invention;

FIG. 5 is a flowchart illustrating operations performed, such as by the computing device of FIG. 2, in order to record a log entry in accordance with an example embodiment of the present invention;

FIG. 6 is a flowchart illustrating operations performed, such as by the computing device of FIG. 2, in order to restore log entries written to the fallback log in accordance with an example embodiment of the present invention;

FIG. 7 is a flowchart illustrating operations performed, such as by the computing device of FIG. 2, in order to determine whether log entries written to the fallback log should be restored to the primary log in accordance with an example embodiment of the present invention; and FIG. 8 is a flowchart illustrating operations performed, such as by the computing device of FIG. 2, in order to restore a single log entry in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device and computer readable media are provided in accordance with an example embodiment in order to record log entries. The log entries may be recorded for error handling purposes, for auditing purposes, for the collection of statistics, for performance monitoring or for various other purposes. A log entry generally includes data and a unique identifier associated with the respective log entry. A log entry may include various types of data including, for example, a message regarding the flow of an application, performance metric(s), a security message, an error message, etc. Log entries may be recorded on a periodic basis and/or in response to one or more particular events. For example, log entries may be recorded on a periodic basis, such as based on a timer, so as to record current statistics associated with a machine and/or application, e.g., memory usage, number of users logged in, etc. As another example, log entries may be recorded in response to a particular event, such as based upon an error condition, an application request, e.g., an application request for data, etc. The method, computing device and computer readable media of an embodiment of the present invention may provide failover capabilities, but may also restore the log entries written during a failover condition so as to maintain a single comprehensive log of the log entries, thereby providing a seamless process for recording log entries in a single log that may thereafter be reviewed and/or otherwise processed.

As shown in FIG. 1, a computing device 10 may be executing one or more applications and may be configured to record log entries. A computing device may be embodied in a wide variety of different manners including as a server, a computer system, a computer workstation, a personal computer or the like. In accordance with an example embodiment, the computing device may be configured to record log entries in a primary log 12, such as a server or other storage locations. In one embodiment, the primary log may be remote from the computing device. As such, the computing device and primary log may be configured to communicate via a network connection, such as a wireless or wireline connection. The computing device and the primary log may be configured to communicate via a wide variety of different networks including, for example, the internet. In one embodiment, the primary log may be provided by a third party logging system. Moreover, the primary log may be provided by cloud computing services, although the primary log may be provided differently in other embodiments.

As also shown in FIG. 1, the computing device 10 may be in communication with a fallback log 14 for recording log entries in an instance in which the log entries cannot be recorded in the primary log 12, such as in an instance in which the network connection between the computing device and the primary log has failed or is otherwise experiencing an error condition and/or in an instance in which the primary log has failed or is otherwise experiencing an error condition. In one embodiment, the computing device and the fallback log may be configured to communicate via a network connection, such as the internet. However, the fallback log of one embodiment may be local to the computing device, such as a storage disk or other memory device that is local to the computing device.

As such, the computing device 10 may be configured to record log entries in the primary log 12, and, in an instance in which the log entries cannot be reliably recorded in the primary log, in the fallback log 14. As such, the computing device provides failover capabilities for continuing to record the log entries even in an instance in which the primary log and/or the connection to the primary log fails or otherwise experiences an error condition. Further, the computing device may be configured to restore the log entries written to the fallback log to the primary log once the primary log and/or the connection to the primary log again becomes operational such that a single comprehensive log of the log entries is maintained by the primary log.

The computing device 10 may be configured in various manners, but, in one embodiment depicted in FIG. 2 includes or is associated and in communication with processing circuitry 22 that is configurable to perform actions in accordance with one or more example embodiments disclosed herein. In this regard, the processing circuitry may be configured to perform and/or control performance of one or more functionalities of the computing device in accordance with various example embodiments, and thus may provide means for performing functionalities of the computing device. The processing circuitry may be configured to perform data processing, application execution and/or other processing and management services according to one or more example embodiments.

In some example embodiments, the processing circuitry 22 may include a processor 24 and, in some embodiments, such as that illustrated in FIG. 2, may further include memory 26. The processing circuitry may be in communication with or otherwise control a communication interface 28 and, in some embodiments, a user interface, such as a display, a keyboard and/or other input/output mechanisms. As such, the processing circuitry may be embodied as a circuit chip (e.g., an integrated circuit chip) configured (e.g., with hardware, software or a combination of hardware and software) to perform operations described herein.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of the computing device 10 as described herein. The plurality of processors may be embodied on a single computing device or distributed across a plurality of computing devices collectively configured to function as the computing device. In some example embodiments, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memory 26 may include one or more non-transitory memory devices such as, for example, volatile and/or non-volatile memory that may be either fixed or removable. In this regard, the memory may comprise a non-transitory computer-readable storage medium. It will be appreciated that while the memory is illustrated as a single memory, the memory may comprise a plurality of memories. The plurality of memories may be embodied on a single computing device or may be distributed across a plurality of computing devices collectively configured to function as the computing device 10. The memory may be configured to store information, data, applications, instructions and/or the like for enabling the computing device to carry out various functions in accordance with one or more example embodiments. For example, the memory may be configured to buffer input data for processing by the processor 24. Additionally or alternatively, the memory may be configured to store instructions for execution by the processor. As yet another alternative, the memory may include one or more databases that may store a variety of files, contents or data sets, such as electronic health records for a plurality of patients. Among the contents of the memory, applications may be stored for execution by the processor in order to carry out the functionality associated with each respective application. In some cases, the memory may be in communication with one or more of the processor or communication interface 28 via a bus or buses for passing information among components of the computing device.

The communication interface 28 may include one or more interface mechanisms for enabling communication with other devices and/or networks, such as the various devices, e.g., primary log 12, fallback log 14 or the like, via which log entries may be recorded. In some cases, the communication interface may be any means such as a device or circuitry embodied in either hardware, or a combination of hardware and software that is configured to receive and/or transmit data from/to a network and/or any other device or module in communication with the processing circuitry 22. By way of example, the communication interface may be configured to enable the computing device 10 to communicate with a primary log, such as a server or other network device, via a wireless network, such as a wireless local area network (WLAN), cellular network, and/or the like. Additionally or alternatively, the communication interface may be configured to enable the computing device to communicate with the primary log and/or the fallback log via a wireline network. In some example embodiments, the communication interface may be configured to enable communication between the computing device and the primary log and/or the fallback log via the internet. Accordingly, the communication interface may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described computing device 10 configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Referring now to FIG. 3, the operations performed, such as by the computing device 10, in order to record log entries are depicted. As shown in block 30 of FIG. 3, the computing device includes processing circuitry 22 configured to write one or more log entries to the primary log 12. During instances in which the primary log is operational and the computing device is capable of communicating with the primary log, such as via a network connection, the log entries are recorded in the primary log as shown by block 30. In one embodiment, each log entry includes data as well as a unique identifier.

The computing device 10 may be configured to identify the state of the primary log 12, such as being either operational or failing, prior to writing log entries to the primary log. For example, the computing device of an example embodiment may be configured to determine the state of the primary log upon initialization of the computing device. The state of the primary log may be determined in various manners. In one embodiment depicted in FIG. 4, however, the computing device, such as the processing circuitry 22, may be configured to determine the state of the primary log by reading the first log entry in the fallback log 14. See block 50. The processing circuitry may then be configured to determine if the entry exists in the fallback log as shown in block 52. If the entry does not exist in the fallback log, the computing device, such as the processing circuitry, may consider the primary log to be operational and the initialization may be complete as shown in state 54. However, if the log entry does exist in the fallback log, the processing circuitry may be configured to mark the primary log as failing as shown in block 56 since log entries remain in the fallback log and have not yet been restored to the primary log as would have been accomplished in an instance in which the primary log was operational. In an instance in which the fallback log is determined to include a log entry upon initialization of the computing device, the processing circuitry may determine that the computing device was powered off while the primary log was in a failing state. After having marked the primary log as failing in this situation, the initialization process is complete. As shown in FIG. 4 and as described below in conjunction with FIGS. 6-8, in an instance in which the primary log is failing, the computing device, such as the processing circuitry, may also be configured to attempt to restore the primary log asynchronously as shown in block 58.

As shown in block 32 of FIG. 3, the computing device 10, such as the processing circuitry 22, may also be configured to determine if writing a log entry to the primary log 12 has failed. If not, the computing device, such as the processing circuitry, is configured to continue to write one or more log entries to the primary log while monitoring for an instance in which a log entry fails to be properly written to the primary log. If writing a log entry to the primary log has failed, however, the computing device, such as the processing circuitry, may be configured to write the log entry to the fallback log 14, thereby providing for failover capability. See block 34.

This alternative writing of the log entry to the primary log 12 or the fallback log 14 depending upon the state of the primary log may be performed in various manners. As shown in FIG. 5, however, the computing device 10 of an example embodiment may be configured to record log entries by initially receiving a log request and log entry information, such as the data to be logged and a unique identifier associated with the respective log entry, as shown in block 60 of FIG. 5. The computing device, such as the processing circuitry 22, of this example embodiment may be configured to determine whether the primary log should be used as shown in block 62. The computing device, such as the processing circuitry, may determine if the primary log should be used by determining if the primary log is operational and the computing device is able to communicate with the primary log or by alternatively determining that the primary log is failing. As described above, the operational state of the primary log and the capability of the computing device to communicate with the primary log may have been determined in upon initialization of the computing device, such as shown in FIG. 4, or in conjunction with determination that an attempt to record a log entry to the primary log has failed as shown in block 32 of FIG. 3. If the state of the primary log has been determined to be failing, the computing device, such as the processing circuitry, may determine that the primary log should not be used, and, in this instance, may be configured to log the log entry directly to the fallback log as shown in block 64, thereby completing the log entry as shown in state 66. However, in an instance in which the computing device, such as the processing circuitry, determines that the primary log is not failing and, as such, may be used to record the log entry, the computing device, such as the processing circuitry, may be configured to record the log entry directly to the primary log as shown in block 68.

The computing device 10, such as the processing circuitry 22, of this example embodiment may then be configured to determine whether the writing of the log entry to the primary log 12 was successful, as shown in block 70 of FIG. 5. The determination as to whether the writing of the log entry to the primary log was successful may be determined in various manners. For example, the primary log may provide an indication to the computing device as to the success or failure of the recordation of the log entry in the primary log. Alternatively, the computing device, such as the processing circuitry, may be configured to read the log entry that was written to the primary log and to compare the log entry that is read from the primary log with the log entry that was to be written. In this embodiment, the computing device, such as the processing circuitry may determine that the recordation of the log entry was successful in an instance in which the log entry that is read is the same as the log entry that was to be written. Conversely, the computing device, such as the processing circuitry, may determine that the recordation of the log entry was unsuccessful in an instance in which the log entry that is read is different than the log entry that was to be written. In an instance in which the log entry is determined to have been successfully recorded in the primary log, the computing device, such as the processing circuitry, may be configured to mark the state of the primary log as not failing, e.g., operational, as shown in block 72 prior to completing the recordation of the log entry as shown at state 66. However, in an instance in which the computing device, such as the processing circuitry, determines that the recordation of the log entry was unsuccessful, the computing device, such as the processing circuitry, may be configured to mark the state of the primary log as failing as shown in block 74 prior to again attempting to record the log entry, such as by repeating the process depicted in FIG. 5. In this manner, the log entry may, in turn, be written to the fallback log 14 as shown in block 64 since the primary log is now indicated to be failing during the second pass through the process of FIG. 5, thereby ensuring that each log entry is recorded. As also shown in block 76 and as described below in conjunction with FIGS. 6-8, the computing device, such as the processing circuitry, may be configured to attempt to restore the primary log asynchronously, such as once the primary log has again become operational so as to ensure that the primary log eventually maintains a comprehensive set of log entries.

Returning now to FIG. 3, once one or more log entries have been written to the fallback log 14, the computing device 10, such as the processing circuitry 22, may be configured to perform a restoration process. In accordance with the restoration process, the computing device, such as the processing circuitry, may be configured to determine whether the log entry that was written to the fallback log may now be written to the primary log 12, such as in an instance in which the primary log as again becomes operational. See block 36 of FIG. 3. In an instance in which the log entry written to the fallback log cannot be written to the primary log, such as in an instance in which the primary log remains in a failing state, the computing device, such as the processing circuitry, may be configured to write any additional log entries to the fallback log as shown in block 38 while continuing to repeatedly determine whether those log entries can be restored to the primary log. If, however, the computing device, such as the processing circuitry, determines that the log entry written to the fallback log may now be written to the primary log, such as in an instance in which the primary log has become operational, the computing device, such as the processing circuitry, may be configured to write one or more log entries that were initially written to the fallback log to the primary log as shown in block 40. The computing device, such as the processing circuitry, of this embodiment may also be configured to delete one or more log entries from the fallback log once the one or more log entries are written to the primary log as shown in block 42 of FIG. 3.

The restoration process by which log entries written to the fallback log 14 are restored to the primary log 12 and deleted from the fallback log as generally shown in blocks 36, 38, 40 and 42 of FIG. 3 may be performed in various manners. In one embodiment, however, the computing device 10, such as the processing circuitry 22, may be configured to receive a request to restore log entries written to the fallback log as shown in block 80 of FIG. 6, such as following a determination that the log entries written to the fallback log may now be written to the primary log, such as in an instance in which the primary log is determined to be operational as shown in block 36 of FIG. 3. After having received the request to restore log entries written to the fallback log, the computing device, such as the processing circuitry of an example embodiment, may wait or delay a predetermined period of time, such as five seconds. See block 82 of FIG. 6. By waiting the predetermined period of time, the restore attempt described below is prevented from occurring more often than the predetermined period of time while permitting the restoration request to occur in an asynchronous manner so as not to block other operations and in contrast to a process that would run synchronously with a conventional timer in which a restoration request could block the performance of other operations.

Following the time delay, the computing device 10 of this example embodiment, such as the processing circuitry 22, may be configured to request restore rights from the fallback log 14 as shown in block 84. In this embodiment, the restore rights are requested from and granted by the fallback log to ensure that the computing device has exclusive access to the fallback log during the subsequent restoration process, thereby increasing the accuracy of the restoration process and avoiding contention within other computing devices that may have also utilized the fallback log. The computing device of this example embodiment, such as the processing circuitry, may be configured to determine whether restore rights were granted by the fallback log as shown in block 86. In an instance in which restore rights were not granted, the restore attempt is considered complete as shown in state 88. Even though the restoration process failed in the above example as a result of another attempt to restore log entries written to the fallback log already being in progress, the computing device, such as the processing circuitry, may be configured to record or write any additional log entries pursuant to the process shown in FIG. 5 to either the primary log or the fallback log depending upon the state of the primary log and, in an instance in which the primary log 12 remains operational, again attempt to restore the log entries written to the fallback log by requesting restore rights from the fallback log is shown in block 84 of FIG. 6.

However, in an instance in which the restore rights were granted by the fallback log 14, the computing device 10, such as the processing circuitry 22, may be configured to determine if all log entries in the fallback log should be restored as shown in blocks 90 and 92. In an instance in which the computing device, such as the processing circuitry, determines that all log entries should not be restored to the primary log 12, the restore attempt may be considered complete as shown in state 88.

As described below and as shown in block 94, in an instance in which it is determined that all log entries should be restored to the primary log 12, X tasks to restore log entries are queued and then performed asynchronously. The overhead associated with the creation of multiple threads to perform the X tasks may be substantial as parallel processing may be resource intensive. For example, each thread to perform a respective task may establish a web connection to a logging service, open socket connections and wait for a response, such as a web request timeout in an instance in which the log entry is unable to be restored. The thread to perform a respective task may therefore block another thread until its execution has been completed. Prior to devoting the resources required to perform the X tasks asynchronously to restore the log entries, the computing device 10, such as the processing circuitry 22, is configured to determine if the restoration is currently possible. As described below in conjunction with FIG. 7, the restoration of all log entries may be prevented in an instance in which there are no log entries to restore and, therefore, the primary log is now healthy as determined in block 104, such as in an instance in which another process may have already restored the log entries, or in an instance in which the primary log is still failing as determined in block 112. Thus, the computing device, such as the processing circuitry, attempts to restore one log entry in a synchronous manner as shown in FIG. 7 in order to determine if the restoration attempt was successful prior to dedicating the processing resources required to asynchronously restore all other log entries.

In an instance in which it is determined, however, that all log entries should be restored, the computing device 10, such as the processing circuitry 22, may be configured to define and queue X tasks, each of which attempts, upon execution, to restore a single log entry asynchronously, such as described below in conjunction with FIG. 8. See block 94 of FIG. 6. In this embodiment, X equals the number of asynchronous threads (each thread configured to perform a task of restoring a respective log entry written to the fallback log 14 to the primary log 12) that are allowed to be consumed by the restoration process and sets the value for the current task counter as shown in block 96 of FIG. 6. As described below in conjunction with FIG. 8, the computing device, such as the processing circuitry, of this example embodiment may also be configured to perform the X tasks to restore the single log entries asynchronously. See block 98.

As shown in FIG. 8 and as described below, each task will restore a single log entry and, if the primary log 12 is healthy, proceed to spawn another asynchronous task as shown in block 154 to restore another respective log entry. Immediately following the spawning of the new task in block 154, the current task is considered complete in block 140 so the thread associated with current task that has now been completed goes out of existence. With the spawning of a new task immediately before the completion of a task, X tasks will be running at all times during the restoration process. This process with X tasks running in parallel so as to asynchronously restore the log entries will continue until each descendent task attempts to read a log entry in block 144 and finds that the log entry does not exist, thereby causing the current task counter to be decremented at block 136. The entire restoration attempt may then be considered complete as shown in block 142 when the last running descendent task decrements the current task counter in block 136 and determines that the current task counter equals zero in block 138. Upon completion of the tasks, each of the single log entries in the fallback log 14 will have been restored to the primary log, thereby ensuring the completeness of the primary log.

As noted above, a determination is made, such as in blocks 90 and 92 of FIG. 6, as to whether all log entries in the fallback log 14 should be restored. The computing device 10, such as the processing circuitry 22, may be configured to determine whether all log entries should be restored in various manners. In one example embodiment, however, the computing device, such as the processing circuitry, may be configured to determine whether all log entries written to the fallback log should be restored to the primary log 12 as shown in FIG. 7. In this embodiment, the computing device, such as the processing circuitry, may be configured to receive a request to determine if all log entries in the fallback log should be restored as shown in block 100. The computing device, such as the processing circuitry, may then be configured to read the first log entry in the fallback log and to determine whether the log entry exists as shown in blocks 102 and 104. In an instance in which the entry does not exist in the fallback log, the computing device, such as the processing circuitry, may be configured to mark the primary log as not failing since no log entries have been written or remain in the fallback log as would have been the case in an instance in which the primary log was failing. See block 106. In this instance in which the primary log is marked as not failing, the log entries should not be restored, since there are no log entries to be restored, and the results, that is, an indication that the log entries should not be restored, may be returned as shown in state 108.

However, in an instance in which the computing device 10, such as the processing circuitry 22, determines that the first log entry does exist in the fallback log 14, the computing device, such as the processing circuitry, may be configured to write the first log entry directly to the primary log 12 as shown in block 110. The computing device, such as the processing circuitry, may then be configured to determine whether the log was successful, that is, whether the first log entry was successfully written to the primary log as shown in block 112. This determination may be made in various manners including based upon an indication provided by the primary log and/or based upon a comparison of the log entry that was written to primary log to the log entry that is subsequently read from the primary log. In an instance in which the computing device, such as the processing circuitry, determines that the log entry was successfully written to the primary log, the computing device, such as the processing circuitry, is configured to mark the primary log as not failing as shown in block 118 and to then delete the log entry that was read from the fallback log as shown in block 120. In this instance, the resulting determination that the log entries should be restored from the fallback log to the primary log may be returned as shown in state 108. However, in an instance in which the computing device, such as the processing circuitry, determines at block 112 that the first log entry was not written successfully to the primary log, the computing device, such as the processing circuitry, may be configured to mark the primary log as failing as shown in block 114. As shown in block 116, the computing device, such as the processing circuitry, may then be configured to attempt to restore the primary log asynchronously, such as described herein in conjunction with FIGS. 6-8. For example, in an instance in which the fallback log includes one or more log entries, but the primary log is still failing, another restoration attempt may be made, asynchronously and following a delay as introduced by block 82 of FIG. 6. The computing device, such as the processing circuitry, may then be configured to return the result that log entries should not be restored as shown in state 108.

In this embodiment, the task to restore a single log entry initially written to the fallback log 14 to the primary log 12 may be performed in various manners. FIG. 8 represents, however, one example embodiment of a task to restore a single log entry to the primary log that may be performed asynchronously. In this embodiment, the computing device 10, such as the processing circuitry 22, may be configured to receive a request to restore a single log entry originally written to the fallback log, to the primary log, as shown in block 130. The computing device, such as the processing circuitry, may then be configured to determine if the primary log is failing, such as based upon the state of the primary log, as shown in block 132. In an instance in which the computing device, such as the processing circuitry, determines that the primary log is not failing, the computing device, such as the processing circuitry, may be configured to read the first log entry from the fallback log as shown in block 144. The computing device, such as the processing circuitry, may then be configured to determine if the first log entry exists in the fallback log as shown in block 146. In an instance in which the first log entry does not exist in the fallback log, the computing device, such as the processing circuitry, may be configured to stop the attempt to restore the single log entry as shown in block 134. While block 134 may stop an attempt to restore the single log entry, such as by terminating the task that is performing the restoration attempt for the respective log entry without spawning another task, the other tasks that are attempting to restore other log entries may continue to execute asynchronously and in parallel. As described below, once all log entries from the fallback log have been restored, all of the currently running tasks will eventually follow the path of FIG. 8 that includes block 134 such that the current task counter is decremented to zero at blocks 136 and 138 and the restoration process is completed at state 142. However, in an instance in which the computing device, such as the processing circuitry, does determine that the first log entry exists in the fallback log, the computing device, such as the processing circuitry, may be configured to delete the log entry that was read from the fallback log as shown in block 148 and to record the log entry in the primary log is shown in block 150.

The computing device 10, such as the processing circuitry 22, may then be configured to determine whether the primary log 12 is failing as shown in block 152. For example, the computing device, such as the processing circuitry, may be configured to determine whether the primary log is failing based upon whether the log entry is properly recorded in the primary log. In an instance in which it is determined that the primary log is failing, the computing device, such as the processing circuitry, may be configured to stop attempts to restore the log entries, as shown in block 134. However, in an instance in which the computing device, such as the processing circuitry, determines that the primary log is not failing and, as such, is operational, the computing device, such as the processing circuitry, may be configured to queue an asynchronous request to restore a single entry, that is, to repeat the task represented by FIG. 8 in regards to another log entry in the fallback log 14 as shown in block 154. Thereafter, the single restore task is completed as shown in state 140.

The computing device 10 is also configured to determine whether all restore tasks have been completed. This determination may be made in various manners. For example, in instances in which the attempt to restore log entries is stopped as shown in block 134, such as in an instance in which the computing device 10, such as the processing circuitry 22, determines that the primary log 12 is failing as shown in blocks 132 and 152 or in an instance in which the first log entry does not exist in the fallback log 14 as shown in block 146, the computing device, such as the processing circuitry, may be configured to decrement the current task counter as shown in block 136. The computing device, such as the processing circuitry, may also be configured to determine whether the current task counter equals 0 as shown in block 138. In an instance in which the current task counter does equal 0, all restore tasks are complete as shown in state 142. Once all restore tasks are determined to be completed, the restore rights granted by the fallback log to the computing device may be released to permit access by other systems to the fallback log. However, in an instance in which the computing device, such as the processing circuitry, determines that the current task counter does not equal 0, the single restore task may be complete as shown in state 140, but additional log entries remain to be restored from the fallback log to the primary log such that the task depicted in FIG. 8 may be asynchronously repeated for each of the remaining log entries pursuant to block 154.

The computing device 10, such as the processing circuitry 22, may repeat the task for restoring log entries as shown, for example, in FIG. 8 in an asynchronous manner until all log entries have been restored, such as represented by the task counter equaling 0 in the example embodiment of FIG. 8 and as described above. As such, the method, computing device and computer readable medium of example embodiments of the present invention provide for failover capability by permitting log entries to be written to the fallback log 14 in an instance in which the primary log 12 has failed and/or the connection between the computing device and the primary log has failed, thereby providing for the seamless recordation of log entries in either the primary log or the fallback log. However, the method, computing device and computer readable medium of an example embodiment restore the log entries written to the fallback log to the primary log once the primary log has again become operational and is no longer failing such that the primary log provides a single comprehensive database of the log entries that may be reviewed for various purposes.

The method, computing device 10 and computer readable medium of an example embodiment may provide advantageous throughput performance because the recordation of log entries need not await the successful completion of the log entry prior to continuing execution of the application or other computer program. Indeed, the method, computing device and computer readable medium of an example embodiment may request that a log entry be recorded asynchronously and to immediately continue program execution, while having assurance that regardless of the current state of the primary log 12, the log entry will be recorded and handled properly. In contrast, a traditional logging system would request that a log entry be recorded in a synchronous manner and then await completion of the recordation of the log entry (which could be an extended time if access to a web service was required) prior to resuming program execution. The delay incurred by a traditional logging system may be further exacerbated in an instance in which there was failure to record the log entry as the program had to await the indication of the error prior to continuing program execution.

As described above, FIGS. 3-8 illustrate flowcharts of a method, computing device 10 and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 26 of a computing device and executed by processing circuitry 22 in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing circuitry 22 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of recording log entries comprising:
   writing one or more log entries to a primary log;
   determining that writing a log entry to the primary log has failed;
   writing the log entry to a fallback log in an instance in which writing the log entry to the primary log has failed; and
   performing, with a processor, a restoration process comprising:
   determining whether the log entry written to the fallback log is able to be written to the primary log by attempting to write the log entry written to the fallback log to the primary log;
   in an instance in which the log entry written to the fallback log is able to be written to the primary log, writing one or more log entries written to the fallback log to the primary log by executing a plurality of tasks to asynchronously write a plurality of log entries written to the fallback log to the primary log; and
   in an instance in which the log entry written to the fallback log is unable to be written to the primary log, repeating the restoration process.

2. A method of claim 1 wherein the primary log comprises a remote system and the fallback log comprises a local storage device.

3. A method of claim 1 wherein in an instance in which the log entry written to the fallback log is able to be written to the primary log, performing the restoration process further comprises deleting one or more log entries from the fallback log once the one or more log entries are written to the primary log.

4. A method of claim 1 wherein writing one or more log entries written to the fallback log to the primary log in an instance in which the log entry written to the fallback log is able to be written to the primary log comprises asynchronously executing the plurality of tasks with each task configured to write a log entry written to the fallback log to the primary log.

5. A method of claim 1 further comprising requesting access to the fallback log and wherein performing the restoration process comprises performing the restoration process contingent upon granting of access to the fallback log.

6. A method of claim 5 wherein performing the restoration process further comprises:
   securing exclusive rights to the fallback log upon granting of access to the fallback log; and
   relinquishing the exclusive rights to the fallback log in an instance in which the restoration process is complete.

7. A computer program product for recording log entries, the computer program product comprising a non-transitory computer readable medium having program code stored thereon, the program code comprising program code instructions configured, upon execution, to perform the method of claim 1.

8. A computer program product of claim 7 wherein ire an instance in which the log entry written to the fallback log is able to be written to the primary log, the program code instructions configured to perform the restoration process are further configured to delete one or more log entries from the fallback log once the one or more log entries are written to the primary log.

9. A computer program product of claim 7 wherein the program code instructions configured to write one or more log entries written to the fallback log to the primary log in an instance in which the log entry written to the fallback log is able to be written to the primary log comprise program code instructions configured to asynchronously execute the plurality of tasks with each task configured to write a log entry written to the fallback log to the primary log.

10. A computer program product of claim 7 wherein the program code further comprises program code instructions configured to request access to the fallback log and wherein the program code instructions are configured to perform the restoration process by performing the restoration process contingent upon granting of access to the fallback log.

11. A computer program product of claim 10 wherein the program code instructions configured to perform the restoration process further comprise program code instructions configured to:
   secure exclusive rights to the fallback log upon granting of access to the fallback log; and
   relinquish the exclusive rights to the fallback log in an instance in which the restoration process is complete.

12. A computing device for recording log entries, the computing device comprising processing circuitry configured to:
   write one or more log entries to a primary log;
   determine that writing a log entry to the primary log has failed;
   write the log entry to a fallback log in an instance in which writing the log entry to the primary log has failed; and
   perform a restoration process comprising:
      determining whether the log entry written to the fallback log is able to be written to the primary log by attempting to write the log entry written to the fallback log to the primary log;
      in an instance in which the log entry written to the fallback log is able to be written to the primary log, writing one or more log entries written to the fallback log to the primary log by executing a plurality of tasks to asynchronously write a plurality of log entries written to the fallback log to the primary log; and
      in an instance in which the log entry written to the fallback log is unable to be written to the primary log, repeating the restoration process.

13. A computing device of claim 12 wherein the primary log comprises a remote system and the fallback log comprises a local storage device.

14. A computing device of claim 12 wherein in an instance in which the log entry written to the fallback log is able to be written to the primary log, the processing circuitry is further configured to perform the restoration process by deleting one or more log entries from the fallback log once the one or more log entries are written to the primary log.

15. A computing device of claim 12 wherein the processing circuitry is configured to write one or more log entries written to the fallback log to the primary log in an instance in which the log entry written to the fallback log is able to be written to the primary log by asynchronously executing the plurality of tasks with each task configured to write a log entry written to the fallback log to the primary log.

16. A computing device of claim 12 wherein the processing circuitry is further configured to request access to the fallback log and wherein the processing circuitry is configured to perform the restoration process by performing the restoration process contingent upon granting of access to the fallback log.

17. A computing device of claim 16 wherein the processing circuitry is configured to perform the restoration process by:
   securing exclusive rights to the fallback log upon granting of access to the fallback log; and
   relinquishing the exclusive rights to the fallback log in an instance in which the restoration process is complete.

18. A computing device for recording log entries, the computing device comprising processing circuitry configured to:
   write one or more log entries to a primary log;
   determine that writing a log entry to the primary log has failed;
   write the log entry to a fallback log in an instance in which writing the log entry to the primary log has failed;
   request access to the fallback log; and
   contingent upon granting of access to the fallback log, perform a restoration process comprising:
      determining whether the log entry written to the fallback log is able to be written to the primary log;
      in an instance in which the log entry written to the fallback log is able to be written to the primary log, writing one or more log entries written to the fallback log to the primary log; and
      in an instance in which the log entry written to the fallback log is unable to be written to the primary log, repeating the restoration process.

19. A computing device of claim 18 wherein the processing circuitry is configured to perform the restoration process by:
   securing exclusive rights to the fallback log upon granting of access to the fallback log; and
   relinquishing the exclusive rights to the fallback log in an instance in which the restoration process is complete.

20. A computing device of claim 18 wherein in an instance in which the log entry written to the fallback log is able to be written to the primary log, the processing circuitry is further configured to perform the restoration process by deleting one or more log entries from the fallback log once the one or more log entries are written to the primary log.

* * * * *